United States Patent
Grubbs et al.

[11] 3,916,145
[45] Oct. 28, 1975

[54] VIEWING SCOPE FOR TURBID ENVIRONMENT AND USE IN UNDERWATER WELDING

[75] Inventors: Conway E. Grubbs, Glen Ellyn, Ill.; Dale R. Anderson, Zachary, La.

[73] Assignee: Chicago Bridge & Iron Company, Oak Brook, Ill.

[22] Filed: Feb. 20, 1973

[21] Appl. No.: 334,040

Related U.S. Application Data

[62] Division of Ser. No. 260,243, June 6, 1972, Pat. No. 3,781,512.

[52] U.S. Cl. .............................. 219/147; 350/96 T
[51] Int. Cl.² ......................................... B23K 9/32
[58] Field of Search ......... 219/147; 350/96 R, 96 B, 350/96 WG, 96 T, 320; 2/2.1

[56] References Cited
UNITED STATES PATENTS

| 2,105,018 | 1/1938 | Tatter .............................. 219/147 X |
| 2,297,799 | 10/1942 | Pifer .................................. 240/2 M |
| 2,586,723 | 2/1952 | Sakols .............................. 240/2 M |
| 3,089,484 | 5/1963 | Hett ................................. 350/96 B |
| 3,091,235 | 5/1963 | Richards .......................... 350/96 B |
| 3,096,430 | 7/1963 | Farr .................................. 219/147 |
| 3,275,795 | 9/1966 | Bosna et al. ................... 219/125 R |
| 3,650,598 | 3/1972 | Kitano et al. .................. 350/96 R |
| 3,756,692 | 9/1973 | Scott ................................ 219/147 |
| 3,779,627 | 12/1973 | Pinnow et al. ............... 350/96 WG |
| 3,779,628 | 12/1973 | Kapron et al. ............... 350/96 WG |

FOREIGN PATENTS OR APPLICATIONS 1,149,238  4/1969  United Kingdom .............. 350/96 T

*Primary Examiner*—J. V. Truhe
*Assistant Examiner*—G. R. Peterson
*Attorney, Agent, or Firm*—Merriam, Marshall, Shapiro & Klose

[57] ABSTRACT

An underwater viewing scope, for viewing in water, having a transparent body with a viewing end and an opposing objective end by which light is transmitted through the body, and a light-absorbing covering on the body except for the two opposing ends.

7 Claims, 13 Drawing Figures

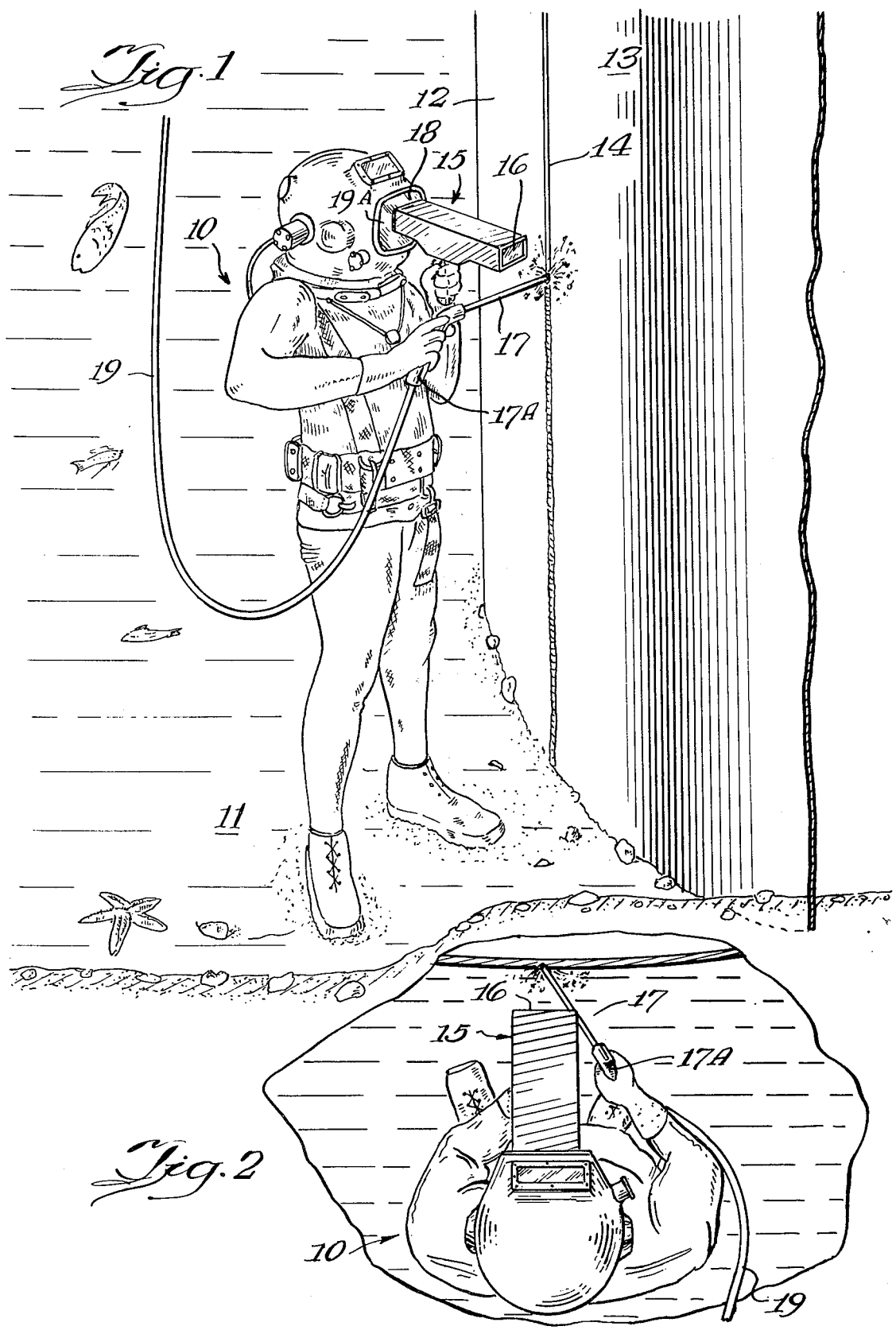

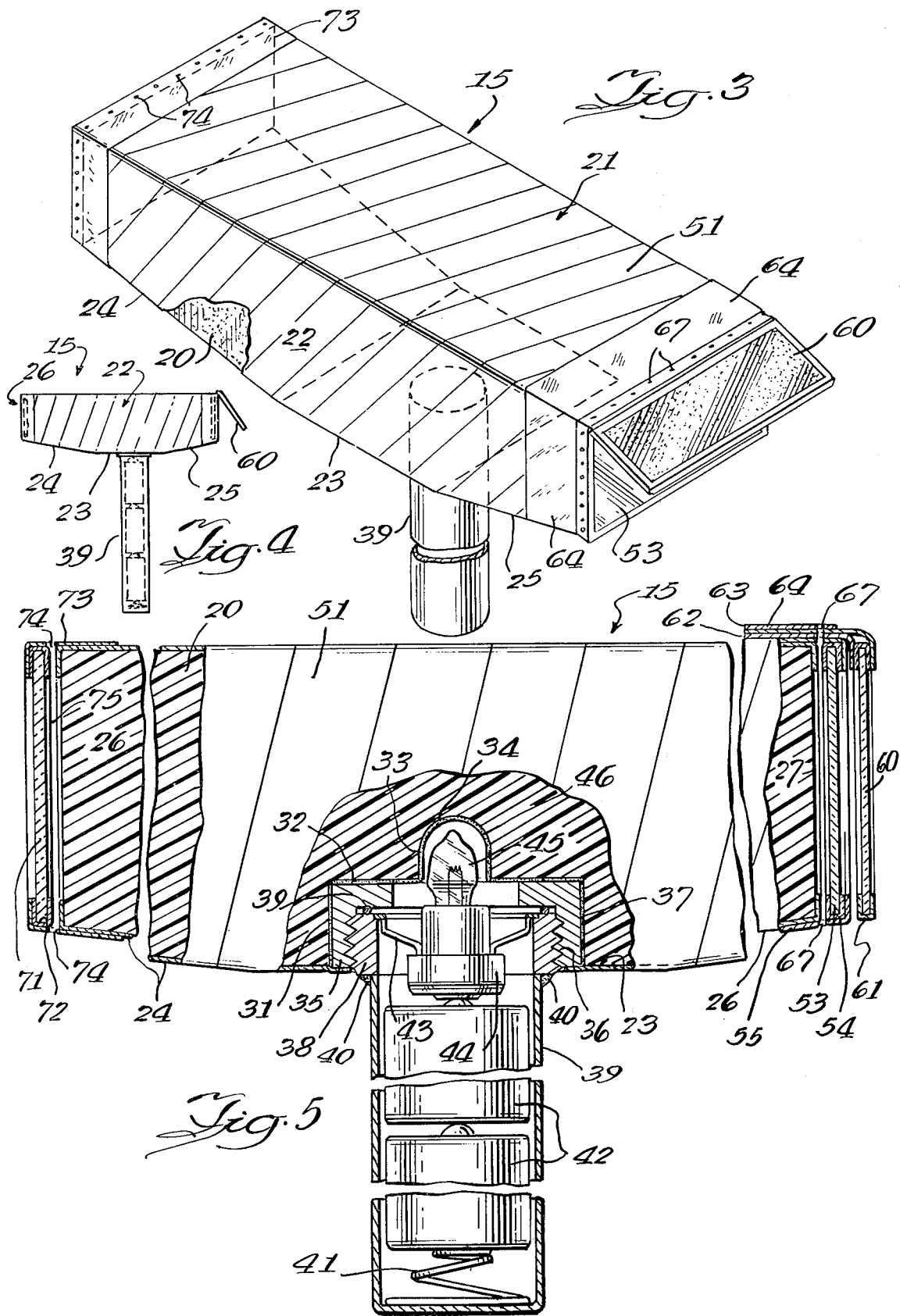

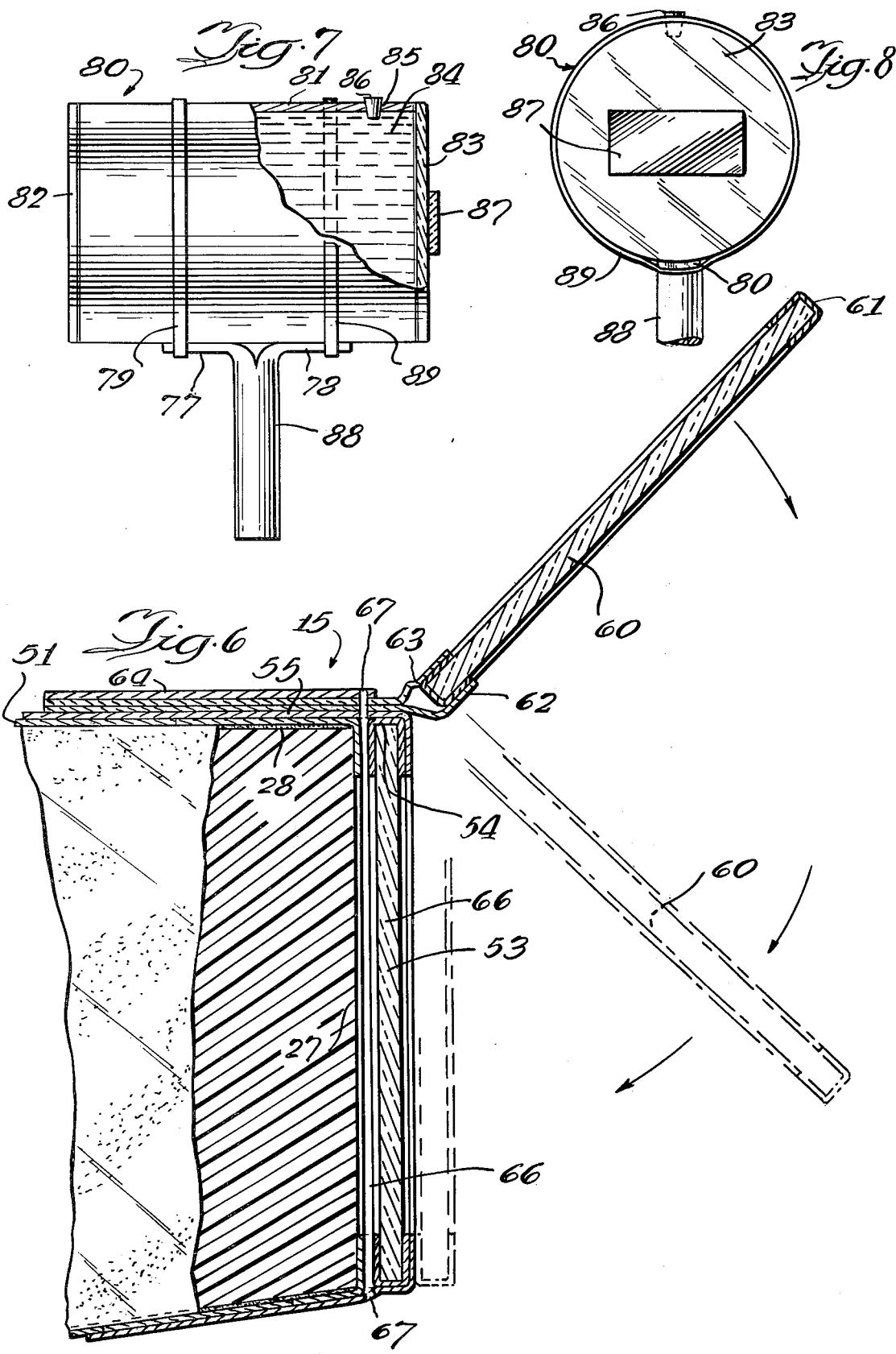

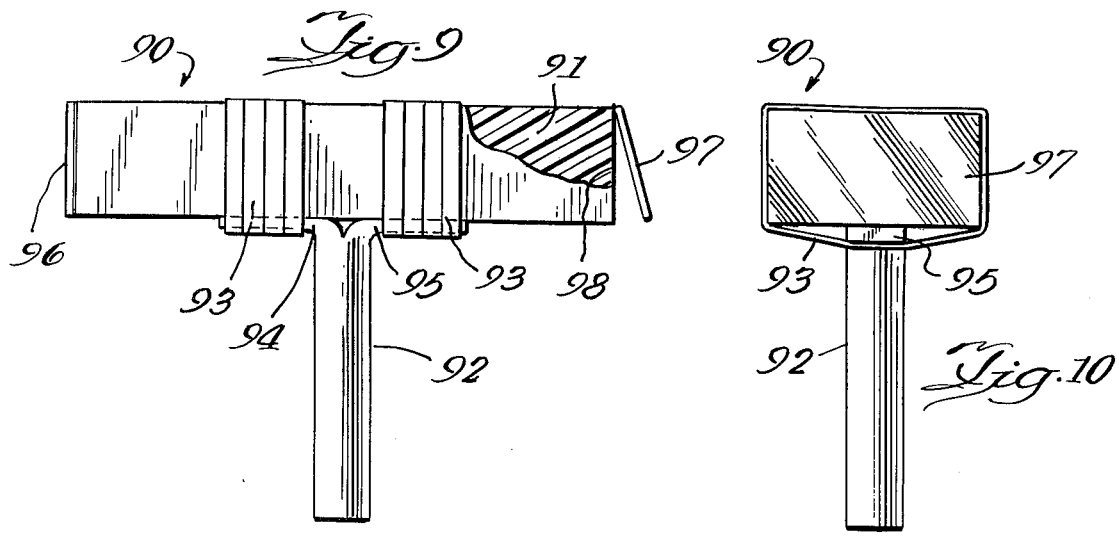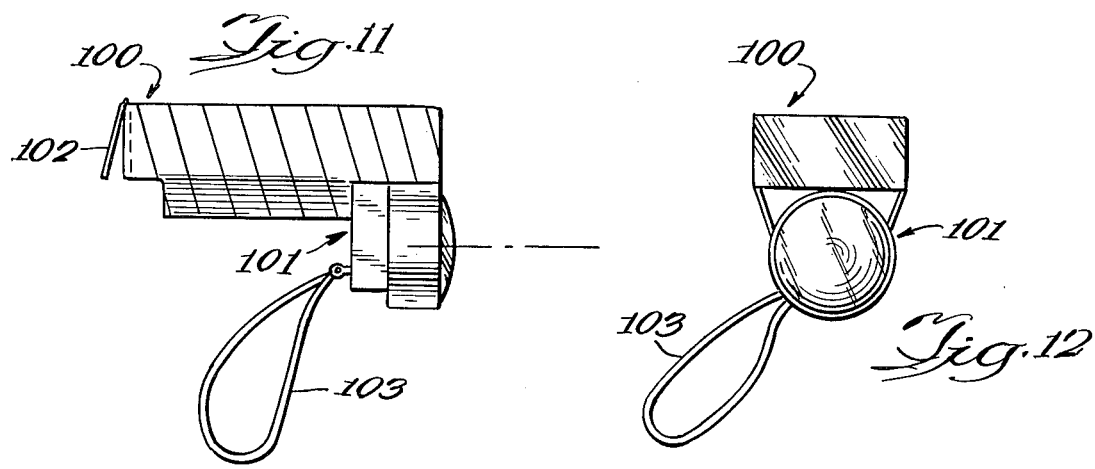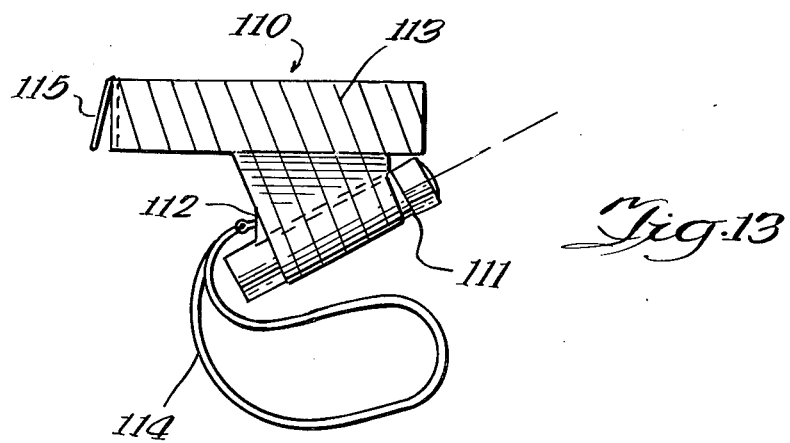

VIEWING SCOPE FOR TURBID ENVIRONMENT AND USE IN UNDERWATER WELDING

This is a division of application Ser. No. 260,243, filed June 6, 1972, now U.S. Pat. No. 3,781,512.

This invention relates to apparatus and methods for viewing an object in a turbid fluid environment. More particularly, this invention is concerned with a viewing scope which permits human observation of an object in a cloudy gas or turbid liquid and its use therein for inspection purposes, welding, metal cutting and the performance of other acts.

It is often desirable to be able to view an object located in a highly turbid environment. Thus, it may be desirable to view an object in a gaseous medium, such as air, obscured by solid or liquid particles which make the gaseous medium cloudy, or to view an object in a liquid medium rendered turbid by solid or liquid particles or gas bubbles. However, the cloudy or turbid nature of the gaseous or liquid environment may so highly obscure or reduce direct human visability as to render difficult or impossible the performance of intended acts or work even if the environment is in daylight, artificial light, or both.

Marine work is exemplary of the fields in which it is important to be able to view an object clearly under water so that inspection and construction work can be done. However, the water is often so turbid at the site that it is impossible for a human to see adequately, with daylight or artificial light, to inspect or do work on a ship's hull, canal lock mechanism, dock structure, pipeline, dam or offshore structure such as used for oil exploration, oil production and storage.

The ability to see adequately underwater has constituted a serious obstacle to the development and utilization of underwater welding in marine work. Much water, where it is desired to do underwater welding, is so turbid that a diver-welder cannot see more than two to six inches even with high-powered lights. Wet welding, in which the object being welded and the molten weld are in contact with the water or some other suitable liquid, can only be effected crudely in such turbid water by blind feel. Neither observation of the weld as it is deposited, nor observation of the weld afterward, is possible in such turbid water. As a result, the welder can not be confident that the weld is made properly. In addition, the turbid water effectively limits the welder to a single crude blind wet weld pass because he cannot see adequately to remove scale from the weld and accurately position and observe the deposit of additional weld passes. Thus, the deposit of multipass wet welds has heretofore not been possible even though multippass wet welds have been desired and needed on much work in turbid water.

Because of the need to make underwater welds in turbid water, it has been proposed previously to flood the area with a gas, or to position a wall around the area to be welded and replace the water in the walled-in space with air or some other gas and to make the weld in the gaseous environment. See U.S. Pat. Nos. 3,632,950; 3,581,042 and 3,521,022. Simple gas flooding alone is of no appreciable help in highly turbid water since it does not permit a sufficiently long visability distance. While a gas chamber system can be used for some underwater welding, it lacks flexibility because of the need to use specially made walled enclosures or bubble chambers for many jobs due to the contours and shapes of the objects to be welded.

According to the present invention, a scope is provided particularly for viewing in a turbid fluid, including a cloudy or turbid gas or a turbid liquid, although it can also be used advantageously in comparatively clear water. The scope has a large number of ues but is especially useful for underwater wet welding, metal cutting, photography, and inspection. A welder using the scope can make high quality single and multipass wet welds in highly turbid water as, for example, water in which human visability in daylight or artificial light is not more than 2 inches.

The scope provided by the invention comprises an optically clear or transparent body or mass having a viewing end and an opposing objective end. The body of the scope can be a hollow tube closed at each end such as with flat plates or such a tube filled with a clear liquid such as water. Advisably, however, the body of the scope is a solid mass. Also, the body of the scope is beneficially covered with a light-absorbing layer of material except for the opposing viewing and objective ends.

The scope is used in a turbid environment by placing the viewing end to a person's eyes and putting the objective end close enough to the object to be viewed so that the distance from the objective end to the object is less than the minimim distance required for turbidity of the environment to obscure the view. Illumination of the object, if not provided by daylight, can be effected by artificial light exterior of or inside the scope. The view through a scope having a light absorbing covering provides tunnel-like vision of the object since the covering prevents exterior diffuse light from blurring or softening the view.

The scope makes possible the viewing of objects in highly turbid water by displacing the turbid water from the line of sight over a distance equal to the length of the scope. This also applies to a turbid or cloudy gaseous environment. The eyes of the viewer thus can be positioned away from the object to be viewed at least as far as the length of the scope and a clear view obtained. The objective end of course can be placed a suitable distance away from the object viewed provided the turbidity between the objective end of the scope and the object does not unduly obscure the view. In some instances it is desirable to flood the area of the object being viewed with a clear liquid, such as clear water, to reduce the turbidity between the object and the scope viewing end. This can be done by directing the end of a water hose towards the object and flooding the viewing area with clear water.

Since it is intended that the scope be used for underwater viewing, the solid body of the scope is advisably made of a noncompressible material. Thus, the body can be made of a solid optically-clear transparent organic plastic material. It also can be made of glass although the density of glass would make the scope heavier than generally desired. The body of the scope is desirably made of one piece of optically-clear transparent material although it can be made of a plurality of pieces. A light-absorbing covering or coating is advisably applied on to the surface of the solid transparent body, except for the viewing and objective ends, to reduce internal light reflectance and blurring. When the scope is to be used for welding, a transparent dark tinted sheet, such as of glass, can be movably mounted on the scope to cover the viewing end during wet welding and to be displaced therefrom for viewing before and after welding is effected.

The scope is used in underwater wet welding in turbid water in which the distance of human visibility when the water is illuminated by daylight or artificial light is less than needed by an underwater welder to directly view and weld a joint to be welded. The scope is positioned in the water between the eyes of an underwater welder and an object to be welded. The viewing end of the scope is positioned close to the eyes of the welder. The objective end of the scope is positioned spaced away from the joint sufficiently far to provide clearance for a welding electrode therebetween but close enough to the object to be welded so that the turbid water does not prevent adequate vision by the welder to weld the object. While the scope is maintained in place, such as by hand, the welder welds the object while observing the weld and object through the scope. The scope is moved along to obtain continuous viewing as welding progresses. Not only can single weld passes be made as described but multipass welds can be made equally as well. A welder using the viewing scope can maintain clear vision while he chips off scale before depositing subsequent weld passes.

Because of the rugged use to which a viewing scope is subjected in underwater welding it must be strong and reliable. It should also be relatively inexpensive, simple to operate and easy to repair. These criteria are most easily met by using for the body of the scope a solid mass or block of transparent optically-clear material, and advisably a solid mass of an organic plastic material such as poly (methyl methacrylate) and poly (methyl acrylate).

Although underwater welds can be made as described using a scope which consists solely of an optically-clear mass or body, it is advisable for welding, and most other purposes, to use for the scope a body which is covered or coated except for the viewing and objective ends. The coating prevents diffuse light from blurring the vision and absorbs internal reflected light which could further interfere with viewing.

The invention will be described further in conjunction with the attached drawings, in which:

FIG. 1 is a perspective view of a diver standing on a sea floor welding a joint in metal plates using a viewing scope according to the invention;

FIG. 2 is a plan view of the welder depositing a weld as in FIG. 1;

FIG. 3 is an isometric view of the viewing scope used by the welder shown in FIGS. 1 and 2;

FIG. 4 is a side elevational view of the viewing scope of FIG. 3;

FIG. 5 is an enlarged side elevational view, partially in section and partially broken away, of the viewing scope of FIGS. 3 and 4;

FIG. 6 is an enlarged elevational view, partially in section, of the viewing end of the viewing scope of FIGS. 3 to 5;

FIG. 7 is a side elevational view of another embodiment of viewing scope in which a hollow tube filled with water is employed;

FIG. 8 is an elevational view of the viewing end of the viewing scope of FIG. 7;

FIG. 9 is a side elevational view of another embodiment of viewing scope in which the body of the viewing scope is a solid optically clear plastic block having a handle affixed to the plastic block;

FIG. 10 is an elevational view of the viewing end of the viewing scope of FIG. 9;

FIG. 11 is a side elevational view of another viewing scope having a light mounted on the bottom of the scope;

FIG. 12 is an elevational view of the objective end of the scope of FIG. 11; and FIG. 13 is a side elevational view of a viewing scope having a flashlight mounted on the bottom.

So far as is practical, the same parts or elements which appear in the different views of the drawings will be identified by the same numbers.

With reference to FIGS. 1 and 2, the diver 10 dressed in a suitable diving suit and having the necessary accompanying equipment is standing on sea floor 11. The vertical edges of metal plates 12 and 13 are positioned abutting together to form joint 14 which the welder is engaged in welding to join the plates. The diver holds viewing scope 15 with his left hand so that the objective end 16 is positioned close to the weld being deposited in joint 14 by means of electrode 17. The viewing end 18 of scope 15 is placed in close contact with face plate 19 of the diver's helmet. Electrode 17 is mounted in an electrode holder 17A which the diver holds in his right hand. The electrode holder 17A and electrode 17 together comprise a welding torch. Electrical power is supplied to the electrode holder 17A and electrode by means of rubber insulated electric cable 19.

The viewing scope 15 used by the diver is shown in greater detail in FIGS. 3 to 6. Viewing scope 15 has a solid body 20 of an optically-clear light transmitting organic plastic material. Body 20 can be a block of solid polymeric methyl acrylate or polymeric methyl methacrylate. Poly (methyl methacrylate) is sold under the trademarks Plexiglass and Lucite. It can be of any suitable length but generally for welding uses it will be at least 8 to 10 inches or more long. The plastic body 20 has a flat rectangular top surface 21 and a pair of identical vertical side walls 22. The bottom of scope body 20 has a flat rectangular surface area 23 substantially parallel to the top surface 21. The flat area 23 is located at the thickest part of the viewing scope body 20. The bottom portion 24 of body 20 extending from the flat central area 23 slopes upwardly and terminates at the objective end 26 of the viewing scope. Similarly, bottom portion 25 of the scope body 20 slopes upwardly and terminates at the viewing end 27 of the scope body. The objective end 26 and the viewing end 27 of the scope solid plastic body 20 are highly polished to provide clear optical surfaces. The top 21, bottom 23, 24, 25 and vertical sides 22 of body 20 are advisably roughened, such as with sandpaper, and then covered with a coat of black paint 28 (FIG. 6).

As shown in FIG. 5, the viewing scope 15 has a vertical circular hole 31 cut in the bottom portion 23 of the scope body. The hole 31 has a flat end 32. Extending inwardly into the solid body 20 from the hole end 32 is circular hole 33 which terminates in a hemispherical end 34. Stainless steel collar 35, which is threaded internally with threads 36, is cemented into hole 31 by a suitable cement 37, such as an epoxy cement.

Stainless steel ring 38 (FIG. 5) is provided with external threads for threading into collar 35. O ring 39 provides a waterproof seal between ring 38 and an adjacent internal flange of collar 35. Stainless steel pipe 39, which is closed at its bottom end, is joined by weld 40 to stainless steel ring 38. Coil spring 41 is located in the bottom of pipe 39. One or more flashlight dry cell electric batteries 42 are positioned inside of pipe 39. Retainer cone 43 holds a bulb holder assembly 44 in position in the upper portion of ring 38 and flashlight bulb 45 is mounted in bulb holder 44. The top of bulb 45 fits into hole 33 with clearance around the bulb. Reflector 46 is mounted in hole 33 to reflect light from bulb 45 to the objective end 26 of the viewing scope so that the light does not shine directly into the eyes of the viewer when he looks through the viewing end 27 of the scope. A suitable switch, not shown, can be mounted on pipe 39 or elsewhere to turn lightbulb 45 on and off. However, the viewing scope can be employed without such a switch. Pipe 39 serves not only as a receptacle for one or more batteries used to provide electrical power to bulb 45 but it also serves as a suitable handle by which the welder can hold the viewing scope while using it.

Instead of making parts such as collar 35, ring 38, pipe 39 and other parts from stainless steel, they can be made of copper, brass or other metal which resists corrosion in sea water.

To prevent black paint applied to the outer surface of solid body 20 from being scratched or chipped off during use, a layer of opaque pressure-sensitive tape 51 is wound around the viewing scope body except for the ends. Duct tape is a suitable pressure-sensitive tape which can be used for this purpose and is preferred since it is readily available, inexpensive and substantially waterproof. The tape 51 is advisably extended over and onto the peripheral edges of the objective end 26 and the edges of the viewing end 27 of the scope body.

Because of the hard use to which the viewing scope is put, such as in making underwater welds, it is advisable to provide protective lenses or plates over the objective end 26 and the viewing end 27. Thus, as shown in FIGS. 5 and 6, optically clear plate 53, such as of glass or clear plastic, is wrapped around its edge with tape 54. Tape 54 extends beyond the peripheral edge of plate 53 onto the front and back faces or surfaces of the plate for a short distance (0.25 in.) inwardly from the peripheral edge. Protective plate 53 is held in position over viewing end 27 by means of tape 55 (FIG. 6) which is wrapped around the viewing body and the edge of plate 53. The edge of the tape 55 is extended over the outer face or surface of plate 53 and pressed down over the peripheral surface of the front face of the plate to further aid in holding it in place. The space 66 between protective plate 53 and viewing end 27 is generally filled with water by means of holes 67 punched into the tape wrappings. The described mounting arrangement provides for ready removal and replacement of protective plate 53 if it should become scratched or broken.

Welder's conventional protective lense or plate 60 has a tape 61 wrapped around its edge. Tinted lense 60 is always used by welders. It serves to protect a welder's eyes from ultraviolet and infrared rays from the welding arc and reduces the amount of light transmitted to the eyes so that the molten metal of the weld puddle can be seen. The edges of the tape 61 extend inwardly along the side edges of the front and back surfaces of the plate. The welder's protective lense 60 can be made of any suitable glass or plastic material to protect the welder's eyes against the glare of the arc during welding. The edges of two layers of tape 62 and 63 are pressed on opposite sides of the top longitudinal edge of welder's protective lense 60 and the free parts of the two tapes are pressed to each other to provide a flexible tab hinge which is secured on the top of the scope body by means of tape 64 wound around the end of the scope. When the welder is not welding, the protective lense 60 is swung or rotated upwardly as shown in FIG. 6 so that a clear view can be obtained through the viewing scope. However, when the welder undertakes to weld, the protective lense 60 is swung downwardly to be close to protective lense 53.

The objective end 26 of the viewing scope is protected by a lense or plate 71 (FIG. 5) which has its edge wrapped with tape 72. Tape 72 extends around to the front and back peripheral surfaces of plate 71. The plate 71, as so wrapped with tape, is held in place over the objective end 26 by means of tape 73 wrapped around the viewing scope body. Holes 74 are punched through the tape in order for water to enter the space 75 between the protective plate 71 and the viewing end 26 of the scope body.

The viewing scope described with reference to FIGS. 3 to 6 can be used by a welder or other diver under water for inspecting objects, making welds and performing various mechanical tasks. The viewing scope is particularly suitable for use in turbid water, especially where single or multi-pass welds are to be made. Furthermore, the viewing scope is highly useful in water which is not strictly turbid. The tunnel-like vision obtained by a welder using the viewing scope permits him to make welds without being distracted by glare reflected from rising gas-filled bubbles which originate at the pool of molten metal at the weld site. When not in use underwater, the viewing scope can be suspended by means of a rope strap around the diver's neck, arm or waist.

The viewing scope of FIGS. 1 to 6 is easily used to make underwater welds in turbid water. Before submerging, the diver should make sure the light is lit and that the batteries are strong. The welder's protective lense on the viewing scope is swung up. When the diver is in position under water he takes the viewing scope by the handle and places the viewing end up against the face plate of the diving helmet or mask with the welder's protective lense still swung up. The diver then moves the objective end of the scope in front of the work, advisably within 1.5 to 2 inches of the work or object to be welded, with the built-in light shining on the area to be welded. After the welder has visually established the exact point where he will start the weld, he positions the welding electrode end very close to, but not touching, the point where the arc is to be struck. Without moving the electrode, the welder then simultaneously moves his head back slightly and makes a short back and then forward motion of the viewing scope. The forward motion, against resistance of the water, hinges the welder's protective or tinted lense down into position for welding. The electrode end is then brought into contact with the work piece and welding commenced. Depending on the welder, he may position his hand holding the electrode holder 17A above, below or to either side of the viewing scope. Furthermore, the viewing scope should be positioned in use so that the weld puddle is seen clearly by the welder without his vision being obscured by the gas bubbles that are released and rise from the weld area.

The viewing scope of FIGS. 1 to 6 can be used for purposes underwater other than welding. It can be used for inspection purposes in turbid water and to facilitate underwater assembly of equipment and parts.

FIGS. 7 and 8 illustrate another form of viewing scope provided by the invention. Viewing scope 80 has a clear plastic tube 81 covered at both ends by clear plastic plates or discs 82 and 83 which are mounted on the tube ends by means of a suitable cement. The resulting closed tube is filled with clear water 84 through hole 85 which is then closed by plug or cork 86. Welder's lense 87 is placed on the viewing plate 83 by means of a suitable adhesive. When a welder is using the viewing scope and is in the act of welding, he can view the weld through welder's lense 87 to protect his eyes. When the welder is not engaged in welding he can view the object to be welded, or any other object, through the clear portion of viewing plate 83. Handle 88 made of a hollow tube has upper forked elements 77 and 78 which are secured to the hollow tube 81 by stainless steel bands 79 and 89. The viewing scope 80 of FIGS. 7 and 8 can be used in turbid water. When it is used in turbid water it is advisable to employ an auxiliary light to illuminate the object to be viewed and welded. The light can be held separate from the viewing scope or mounted on the scope. If desired, the viewing scope can be covered with an opaque material to obtain tunnel vision when it is used.

FIGS. 9 and 10 illustrate a third embodiment of viewing scope provided by the invention. The viewing scope 90 has an elongated optically clear plastic body 91, rectangular in lateral cross section, mounted on a tubular handle 92. Forked elements 94 and 95, comprising extensions of the tubular handle 92, are secured to body 91 by tape 93 wrapped around the body. A protective lense or plate 94 is placed over the objective end of the scope body 91 to protect it against wear and abrasion. Protective plate 96 can be held in place by pressure-sensitive tape. Welder's lense 97 is hingeably mounted over viewing end 98 of the viewing scope. Welder's lense or plate 97 is hingeably mounted so that it can be swung out of the way when welding is not being done so that the welder can have a clear view through the scope to the object. Welder's lense 97 can be mounted on body 91 by means of tape in the same way that welder's lense 60 is mounted on the viewing scope 15 described in conjunction with FIGS. 3 to 6. Viewing scope 90 can be employed in clear water without auxiliary light. However, in turbid water it is advisable to employ a suitable auxiliary light for better visability. Furthermore, to achieve tunnel vision with viewing scope 90, the outer surface of body 91 can be coated with a suitable material, such as black paint, or an opaque covering.

FIGS. 11 and 12 illustrate still another embodiment of viewing scope provided by the invention. Viewing scope 100 has a solid clear plastic body covered with black paint. Viewing scope 100 is made of a solid optically-clear plastic rectangular block having opposing polished ends. Lantern 101 is bound to the bottom of viewing scope 100 by means of pressure-sensitive tape wound around the lantern and the viewing scope. Electrical power for the lantern can be supplied by batteries enclosed in the lantern or carried by the diver or by means of a wire from a boat on the sea surface or from a source on land. Welder's lense 102 is hingeably mounted at the viewing end of the scope and when not in use it is rotated upwardly out of the way to improve vision through the scope. Rope handle 103 is provided for use in carrying the viewing scope. The viewing scope is operated in essentially the same manner described with reference to the other embodiments of viewing scopes described previously herein.

FIG. 13 illustrates a viewing scope 110 which is essentially like viewing scope 100 of FIGS. 11 and 12, except, however, that a flashlight 111 is mounted on the bottom of viewing scope 110 by means of a bracket 112. Pressure-sensitive tape 113 wound around the composite structure binds the viewing scope, bracket and flashlight together. Handle 114 is provided to facilitate carrying the viewing scope. Welder's lense or plate 115 is hingeably mounted to the viewing end of the scope and when not in use in welding it is rotated upwardly so that it does not interfere with clear vision through the scope.

If it is not desired to have tunnel vision when using any of the viewing scopes described herein, the body of the scope can be left noncoated or noncovered. A coated viewing scope is preferred however because it blocks out reflected light from gas bubbles rising from a welding site. For this reason, the viewing scope is advantageously employed even when welding in water of comparatively good visability.

Any of the viewing scopes can be mounted directly on the diver's helmet or mask instead of having it hand held.

The viewing scope in its preferred form in which the body is a solid block of plastic is lightweight underwater since it is constructed of materials which are not much heavier than water. This facilitates its use without fatiguing the user.

Phosphorescent or fluorescent material can be positioned at the objective end of the viewing scope to increase visability. The light from the welding arc will activate the material and in turn it will provide light for a short period after the welding arc is extinguished. This will aid inspection by the welder and starting of the weld again.

Visability of the weld, or other view, can be further improved by flooding the space between the objective end of the viewing scope and the object or work piece with a clear liquid, such as clear water. A tube or hose can be used to feed the liquid to the weld area to achieve the desired flooding. The hose can be handled in any suitable way to properly direct the liquid as a stream to the welding area. Thus, it can be mounted on the viewing scope with the tube end pointed towards the weld to direct the liquid above or below the weld as needed to accommodate the density of the liquid to the surrounding water. With a liquid less dense than the water, the liquid should be fed below the weld so that it flows upwardly after release from the tube and vice versa for a heavier-than-water liquid.

The foregoing detailed description has been given for clearness of understanding only, and no unnecessary limitations should be understood therefrom, as modifications will be obvious to those skilled in the art.

What is claimed is:

1. An underwater welder's scope for viewing and welding in turbid water comprising:
a rigid transparent optically clear light-transmissive one-piece elongated solid mass having a viewing end and an opposing objective end, through which light may enter the mass and then pass through the mass and out of the viewing end,
a light-absorbing covering on the solid mass surface except for the two said opposing ends,
a welder's eye-protecting plate,
means removably mounting the eye-protecting plate on the solid mass to be removably positioned over the viewing end of the solid mass during welding underwater,
a handle,
means connecting the handle to the solid mass so that a welder can hold the scope during viewing and welding underwater,
a light, and
means mounting the light on the solid mass to illuminate an object viewed through the scope during welding.

2. An underwater welder's scope according to claim 1 including:
a recess in the transparent solid mass,
means mounting the light in the recess, and
means mounting a light reflector adjacent the light to direct light out the objective end of the solid mass.

3. An underwater welder's scope for viewing and welding in turbid water comprising:
a rigid transparent optically clear light-transmissive one-piece elongated solid mass having a viewing end and an opposing objective end, through which light may enter the mass and then pass through the mass and out the viewing end,
a light-absorbing covering on the solid mass surface except for the two said opposing ends,
a first flat optically clear transparent plate and means replaceably mounting the first plate on the solid mass to cover the viewing end,
a second flat optically clear transparent plate and means replaceably mounting the second plate on the solid mass to cover the objective end,
a welder's eye-protecting plate,
means removably mounting the eye-protecting plate to the solid mass to be removably-positioned over the first flat optically clear transparent plate during welding underwater,
a handle,
means connecting the handle to the solid mass so that a welder can hold the scope during viewing and welding underwater,
a light, and
means mounting the light to the solid mass to illuminate an object viewed through the scope during welding.

4. An underwater welder's scope according to claim 3 including:
means spacing the first plate from the viewing end and water filling the space thereby defined, and
means spacing the second plate from the objective end and water filling the space thereby defined.

5. An underwater welder's scope according to claim 3 including:
at least one battery to provide power for the light, and
means mounting the battery to the scope.

6. An underwater welder's scope for viewing and welding in turbid water comprising:
a rigid transparent optically clear light-transmissive one-piece elongated solid mass having a viewing end and an opposing objective end, through which light may enter the mass and then pass through the mass and out the viewing end,
a light-absorbing black covering on the solid mass surface except for the two said opposing ends,
a first flat optically clear transparent plate and means replaceably mounting the first plate on the solid mass to cover the viewing end,
a second flat optically clear transparent plate and means replaceably mounting the second plate on the solid mass to cover the objective end,
a welder's eye-protecting plate,
means removably mounting the eye-protecting plate to the solid mass to be removably-positioned over the first flat optically-clear transparent plate during welding underwater,
a handle,
means connecting the handle to the solid mass so that a welder can hold the scope during viewing and welding underwater;
a light,
means mounting the light on the body to illuminate an object viewed through the scope during welding,
a recess in the transparent solid mass,
means mounting the light in the recess,
means mounting a light reflector adjacent the light to direct light out the objective end of the solid mass,
at least one battery to provide power for the light, and
means mounting the battery to the scope.

7. An underwater welder's scope according to claim 6 in which:
the first and second transparent plates and the eye-protecting plate are replaceably mounted to the solid mass by flexible pressure sensitive tape, and
the solid mass, except for the viewing and objective ends, is covered with a protective layer of a pressure sensitive tape.

* * * * *